(12) United States Patent
Aripirala et al.

(10) Patent No.: US 12,282,335 B2
(45) Date of Patent: Apr. 22, 2025

(54) SYSTEM AND METHOD FOR OPERATING AN AIRCRAFT DURING A CLIMB PHASE OF FLIGHT

(71) Applicant: THE BOEING COMPANY, Chicago, IL (US)

(72) Inventors: Chaitanya Pavan Kumar Aripirala, Bangalore Karnataka (IN); Veeresh Kumar Masaru Narasimhulu, Bangalore Karnataka (IN); Joost E. Koennen, Meppel (NL); James R. Hamilton, Federal Way, WA (US); J. L. Tylee, Seattle, WA (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 18/150,856

(22) Filed: Jan. 6, 2023

(65) Prior Publication Data
US 2024/0231366 A1    Jul. 11, 2024

(51) Int. Cl.
| | |
|---|---|
| *G05D 1/485* | (2024.01) |
| *B64D 43/00* | (2006.01) |
| *B64D 43/02* | (2006.01) |
| *B64D 45/00* | (2006.01) |
| *G05D 1/00* | (2006.01) |
| *G05D 1/644* | (2024.01) |

(52) U.S. Cl.
CPC ............. *G05D 1/042* (2013.01); *B64D 45/00* (2013.01)

(58) Field of Classification Search
CPC ........ G05D 1/042; G05D 1/485; G05D 1/644; G05D 2105/22; G05D 2107/13; G05D 2109/22; B64D 45/00

USPC .......................................................... 701/16
See application file for complete search history.

(56) References Cited

U.S. PATENT DOCUMENTS

| | | | | |
|---|---|---|---|---|
| 5,070,458 | A * | 12/1991 | Gilmore ............... | G05D 1/0005 |
| | | | | 702/182 |
| 10,671,092 | B2 * | 6/2020 | DiRusso .......... | G06Q 10/06315 |
| 11,449,078 | B1 * | 9/2022 | Freiheit .................. | G08G 5/025 |
| 2013/0085672 | A1 * | 4/2013 | Stewart .................. | G08G 5/003 |
| | | | | 701/528 |
| 2014/0277853 | A1 * | 9/2014 | Castillo-Effen ...... | G08G 5/0095 |
| | | | | 701/3 |
| 2014/0336849 | A1 * | 11/2014 | K ........................... | G01C 23/00 |
| | | | | 701/4 |
| 2018/0088593 | A1 * | 3/2018 | De Tarso Ferreira ....... | |
| | | | | B64C 13/503 |

(Continued)

OTHER PUBLICATIONS

Extended European Search Report for EP 24150234.3, dated Apr. 10, 2024.

(Continued)

*Primary Examiner* — Tyler D Paige
(74) *Attorney, Agent, or Firm* — Joseph M. Butscher; The Small Patent Law Group LLC

(57) ABSTRACT

A system and a method for operating an aircraft during a climb phase of flight include a control unit configured to receive data regarding one or both of a current flight or one or more previous flights of the aircraft from one or more sensors of the aircraft. The control unit is further configured to determine efficient climb phase parameters for the aircraft based on the data. The aircraft is operated during the climb phase of one or both of the current flight or one or more future flights according to the efficient climb phase parameters.

20 Claims, 4 Drawing Sheets

(56) References Cited

U.S. PATENT DOCUMENTS

| | | | |
|---|---|---|---|
| 2019/0121369 A1* | 4/2019 | DiRusso | G06Q 10/06315 |
| 2020/0026307 A1* | 1/2020 | Lax | G08G 5/0039 |
| 2020/0202723 A1* | 6/2020 | Pierre | G06N 3/08 |
| 2020/0257313 A1* | 8/2020 | DiRusso | B64C 13/18 |

OTHER PUBLICATIONS

Lyu Yuan et al: "Flight performance analysis with data-driven mission parameterization: mapping flight operational data to aircraft performance analysis", Transportation Engineering, vol. 2, Nov. 19, 2020.
Huang Chenyu et al: "Estimation of aircraft fuel consumption by modeling flight data from avionics systems", Journal of Air Transport Management, Pergamon, Amsterdam, NL, vol. 99, Jan. 6, 2022.
Alliger Richard: "Predictive Joint Distribution of the Mass and Speed Profile to Improve Aircraft Climb Prediction", 2020 International Conference on Artificial Intelligence and Data Analytics For Air Transportation (AIDA-AT), ISEE, Feb. 3, 2020, pp. 1-10.

\* cited by examiner

SYSTEM AND METHOD FOR OPERATING AN AIRCRAFT DURING A CLIMB PHASE OF FLIGHT

FIELD OF THE DISCLOSURE

Examples of the present disclosure generally relate to systems and methods for operating an aircraft during a climb phase of flight.

BACKGROUND OF THE DISCLOSURE

Aircraft are used to transport passengers and cargo between various locations. Numerous aircraft depart from and arrive at a typical airport every day.

Various phases of flight for an aircraft occur. For example, phases of flight for an aircraft include ground, climb, cruise, and descent. International Civil Aviation Organization (ICAO) and International Air Transport Association (IATA), for various purposes, define phases of a typical flight.

A climb phase of flight is between a takeoff and a top of climb, which is the beginning of a cruise phase of flight. The climb phase of a commercial aircraft flight is typically demanding in terms of fuel consumption, as energy is required to gain both altitude and speed. In contrast, aircraft generally operate more efficiently at cruise conditions. As such, as an aircraft climbs toward a cruise altitude, the aircraft may not optimally operate in relation to fuel efficiency.

Currently most commercial aircraft fly with a fixed airspeed during a climb phase, thereby resulting in an increased fuel burn and cost. Such speed is typically determined based on a general class of aircraft. For example, a test aircraft representative of an entire class or fleet of aircraft can be used to determine the fixed speed during climb. However, each aircraft is different to some extent in the way it is built, flown and maintained. Accordingly, determining attributes for a climb phase based on a single test aircraft typically does not account for various factors related to particular aircraft that are in use at a later time. Moreover, aircraft can be retrofit with aerodynamic surfaces, but the speed mapping based on a prior test aircraft is not updated, which further widens the gap between reality and perceived flight costs.

SUMMARY OF THE DISCLOSURE

A need exists for a system and a method for efficiently operating an aircraft during a climb phase of flight. With that need in mind, certain examples of the present disclosure provide a system for operating an aircraft during a climb phase of flight. The system includes a control unit configured to receive data regarding one or both of a current flight or one or more previous flights of the aircraft from one or more sensors of the aircraft. The control unit is further configured to determine efficient climb phase parameters for the aircraft based on the data. The aircraft is operated during the climb phase of one or both of the current flight or one or more future flights according to the efficient climb phase parameters.

In at least one example, the system also includes the one or more sensors. As an example, the one or more sensors include one or more flight recorders. As another or further example, the one or more sensors further include one or more of one or more speed sensors, one or more altitude sensors, one or more position sensors, one or more ambient sensors, or one or more weight sensors.

In at least one example, the control unit is onboard the aircraft.

In at least one example, the control unit is configured to determine the efficient climb phase parameters for a future flight of the aircraft based on the data received from one or more previous flights of the aircraft.

In at least one example, the control unit is configured to determine the efficient climb phase attributes by generating one or more climb phase neural network models for the aircraft based on the data.

The control unit can be further configured to show the efficient climb phase attributes on a monitor within a flight deck of the aircraft.

In at least one example, the control unit is configured to determine the efficient climb phase attributes by determining a lowest cost index from a plurality of cost indices.

In at least one example, the control unit is further configured to automatically operate controls of the aircraft during the climb phase according to the efficient climb phase parameters.

Certain examples of the present disclosure provide a method for operating an aircraft during a climb phase of flight. The method includes receiving, by a control unit, data regarding one or both of a current flight or one or more previous flights of the aircraft from one or more sensors of the aircraft; and determining, by the control unit, efficient climb phase parameters for the aircraft based on the data, wherein the aircraft is operated during the climb phase of one or both of the current flight or one or more future flights according to the efficient climb phase parameters.

Certain examples of the present disclosure provide a non-transitory computer-readable storage medium comprising executable instructions that, in response to execution, cause one or more control units comprising a processor, to perform operations including receiving data regarding one or both of a current flight or one or more previous flights of an aircraft from one or more sensors of the aircraft; and determining efficient climb phase parameters for the aircraft based on the data, wherein the aircraft is operated during a climb phase of one or both of the current flight or one or more future flights according to the efficient climb phase parameters.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and method that address inefficient speed profiles used during climb, which can result in higher fuel burn than is optimal. Airline operators may not have the ability to refine climb speeds and simply use a standard climb speed, such as is determined from a single test aircraft. Examples of the present disclosure eliminate, minimize, or otherwise reduce such inefficiencies by leveraging flight data and applying data science and aircraft performance algorithms to determine an actual least cost climb cost index, which includes both cost of fuel and cost of time. Additionally, examples of the present disclosure minimize or otherwise reduce carbon emissions by minimizing or otherwise reducing fuel burn.

In at least one example, the systems and methods use data from the aircraft flight recording data sets to capture the optimal speed and climb-rates for each tail. The systems and methods use real flight recording data to adjust climb performance. In contrast, prior known methods use cruise-phase flight data for optimization and typically rely on a single flight test aircraft to establish a baseline. In at least one example, the systems and methods generate cost index optimization data to enable easier use by pilots and also more accurate models of the aircraft fuel burn performance during climb. The systems and methods described herein refine fuel efficiency by using tail specific performance (that is, performance of the specific, actual aircraft, in contrast to a different test aircraft), which delivers precise data compared to pre-set fixed speeds generated by flight planning systems.

Figure 1:
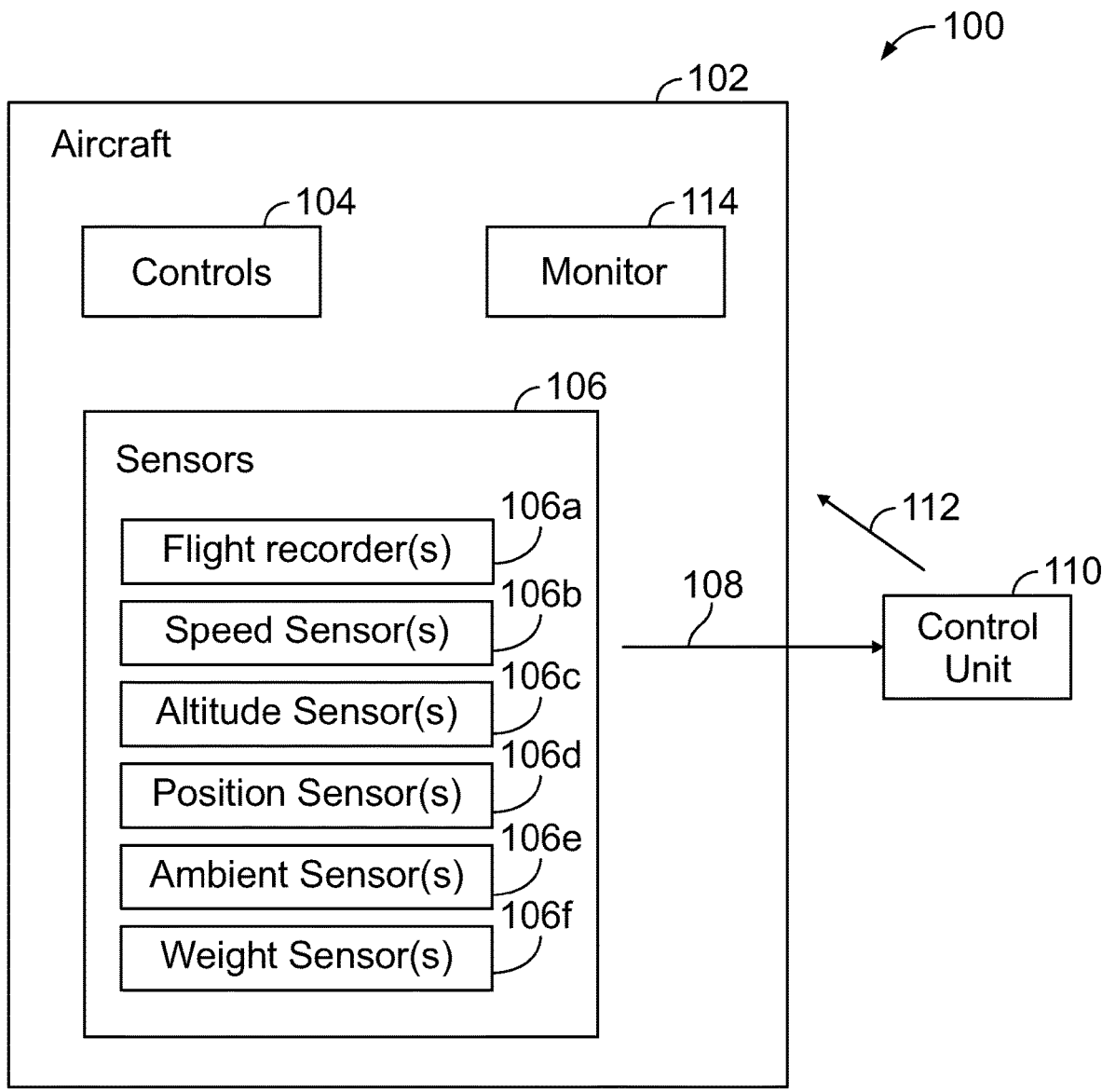
FIG. 1 illustrates a schematic block diagram of a system for operating an aircraft during a climb phase of flight, according to an example of the present disclosure.

FIG. 1 illustrates a schematic block diagram of a system 100 for operating an aircraft 102 during a climb phase of flight, according to an example of the present disclosure. The aircraft 102 includes controls 104 that are configured to control operation of the aircraft 102. For example, the controls 104 include one or more of a control handle, yoke, joystick, control surface controls, accelerators, decelerators, and/or the like.

The aircraft 102 further includes a plurality of sensors 106 that detect various aspects of the aircraft 102. As an example, the sensors 106 include one or more flight recorders 106a that record various aspects of the aircraft 102 during a flight, including the climb phase. A speed sensor 106b of the aircraft 102 outputs a speed signal indicative of a ground and/or air speed of the aircraft 102. An altitude sensor 106c of the aircraft 102 outputs an altitude signal indicative of an altitude of the aircraft 102. A position sensor 106d outputs a position signal of the aircraft. As an example, the position signal can be an automatic dependent surveillance-board (ADS-B) signal. As another example, the position signal can be a global positioning system (GPS) signal that is monitored by a corresponding GPS monitor. In at least one example, GPS allows for determination of position, and ADS-B provides a transmission system to broadcast the position, which can be determined through GPS and/or inertial sensors.

The sensors 106 can also include one or more ambient sensors 106e. For example, an ambient sensor 106e can include a temperature sensor that is configured to detect an ambient temperature surrounding the aircraft 102. As another example, an ambient sensor 106e can include a wind speed sensor.

The sensors 106 can also include one or more weight sensors 106f. For example, the weight sensors 106f can include a sensor that is configured to detect an overall weight of the aircraft. As another example, the weight sensors 106f can include a sensor that is configured to detect a fuel weight within the aircraft 102. As another example, the weight sensors 106f can include a sensor configured to determine a center of gravity of the aircraft 102.

The sensors 106 can include more or less sensors than shown. The sensors 106 can detect additional aspects of the aircraft 102 other than position, speed, and altitude. For example, one or more temperature sensors can detect temperatures of one or more portions of the aircraft (such as engine temperature sensors). As another example, fuel level sensors can detect a remaining fuel level of the aircraft.

The sensors 106 output data 108 indicative of the various aspects detected thereby. For example, the data 108 includes avionics data output by the flight recorder(s) 106a. A control unit 110 is in communication with the sensors 106 through one or more wired or wireless connections, and is configured to receive the data 108 from the sensors 106.

In at least one example, the control unit 110 is onboard the aircraft 102. For example, the control unit 110 can be part of a flight computer of the aircraft 102. As another example, the control unit 110 can be part of a handheld device (such as a smart phone or smart tablet), a portable computer, a computer workstation, and/or the like within the aircraft 102. As another example, the control unit 110 can be remote from the aircraft 110/

In operation, the sensors 106 detect various aspects of the aircraft 102 during a flight. For example, the sensors 106 detect various aspects of the aircraft 102 before and during a climb phase of flight. The sensors 106 output the data 108 indicative of the various aspects of the aircraft 102 before and/or during the climb phase of flight. The control unit 110 receives the data 108 for the particular aircraft 102 (as opposed to a test aircraft). As described herein, the control unit 110 analyzes the data 108 to determine an efficient climb phase for a future flight of the specific, particular aircraft 102. For example, the control unit 110 determines an efficient climb speed (for example, vertical speed and horizontal speed in relation to the ground) for the aircraft 102. Instead of relying on a generic determination for the climb phase, the control unit 110 determines efficient climb phase attributes (such as vertical speed, horizontal speed, time of climb, and/or the like) based on actual data 108 output by the sensors 106 of the aircraft 102 during one or more actual flights of the aircraft 102. For example, the control unit 110 can determine efficient climb phase attributes for a future flight of the aircraft 102 based on the data 108 from one or more previous flights. In at least one example, the control unit 110 determines the efficient climb phase attributes for a future flight based on the data 108 received from an immediately prior flight of the aircraft 102. As another example, the control unit 110 determines the efficient climb phase attributes for the future flight of the aircraft based on the data 108 from a plurality of previous flights, such as the most recent 10, 20, 30, 40, or more flights of the aircraft 102. In this manner, the additional data from a plurality of flights of the aircraft 102 provides a more robust and refined determination of the efficient climb phase attributes.

In at least one example, the control unit 110 determines the efficient climb phase attributes for a current or future flight of the aircraft 102 by generating one or more climb phase models for the aircraft 102 based on the data 108 received from the actual aircraft 102 (that is, the specific tail associated with the aircraft 102), instead of a different aircraft or generic model.

In a least one example, the control unit 110 receives the data 108 from the sensors 106 in the form of one or more aircraft flight recording data sets, such as from the flight recorder(s) 106*a*. The control unit 110 analyzes the data 108 to determine an efficient (for example, optimal) speed and climb-rates for the actual, specific aircraft 102 from which the data 108 is recorded and output, and received by the control unit 110. As such, the control unit 110 uses real flight recording data of the specific aircraft 102 to adjust climb phase performance. In at least one example, the control unit 110 receives the data 108 and generates a cost index optimization to enable easier use by pilots and also more accurate models of the aircraft fuel burn performance during the climb phase. The control unit 110 refines fuel efficiency by using tail specific performance (that is, regarding the actual aircraft 102, in contrast to a different aircraft).

In at least one example, the flight recorder(s) 106*a* includes an aircraft interface device and transmitter that outputs the data 108, such as avionics data, to the control unit 110. As noted, the control unit 110 is in communication with the flight recorder(s) 106*a* through one or more wired or wireless connections, such as through WiFi, Bluetooth, cellular, or other such connections. In at least one example, the control unit 110 determines the efficient climb phase attributes and outputs a signal 112 including data regarding the efficient climb phase attributes. A flight computer receives the signal 112, such as through one or more wired or wireless connections, and information regarding the efficient climb phase attributes can be shown on a monitor 114 (such as an electronic screen, television, touch screen, and/or the like) within the flight deck.

After the flight of the aircraft 102, the data 108 can be stored, such as in cloud servers, which can be used to perform post-flight analytics to estimate savings, further fine tune performance models, and/or the like.

As described herein, the system 100 for operating the aircraft 102 during a climb phase of flight includes the control unit 110, which is configured to receive the data 108 regarding one or both of a current flight or one or more previous flights of the aircraft 102 from the one or more sensors 106 of the aircraft 102. The control unit 110 is further configured to determine efficient climb phase parameters for the aircraft 102 based on the data 108. The aircraft 102 is operated during the climb phase of one or both of the current flight or one more future flights according to the efficient climb phase parameters.

Figure 2:
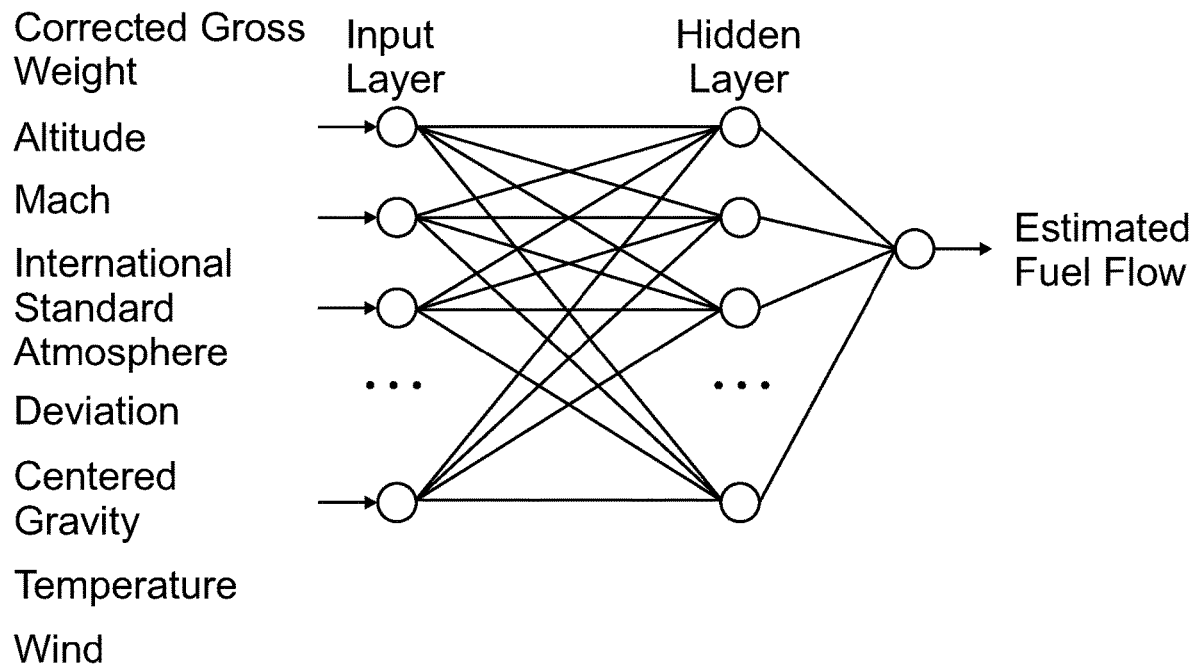
FIG. 2 illustrates a simplified view of a neural network fuel flow model for a climb phase of a flight of an aircraft, according to an example of the present disclosure.
Figure 3:
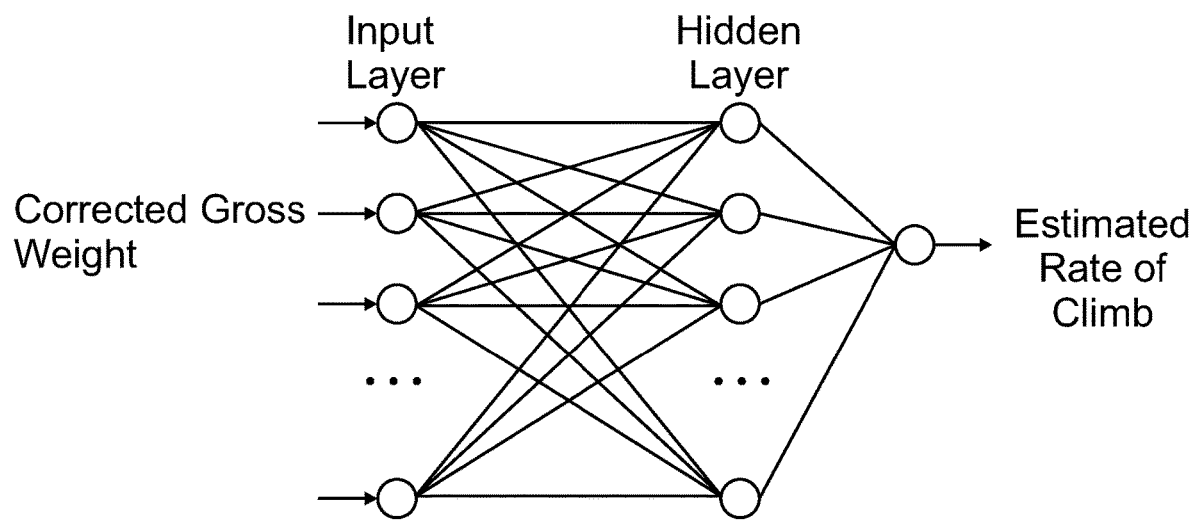
FIG. 3 illustrates a simplified view of a neural network model for rate of climb of a climb phase of a flight of an aircraft, according to an example of the present disclosure.

FIG. 2 illustrates a simplified view of a neural network fuel flow model for a climb phase of a flight of an aircraft, according to an example of the present disclosure. FIG. 3 illustrates a simplified view of a neural network model for rate of climb of a climb phase of a flight of an aircraft, according to an example of the present disclosure. Referring to FIGS. 1-3, the neural network models can receive inputs, such as the data 108, which can include corrected gross weight of the aircraft 102, altitude of the aircraft, Mach (airspeed) of the aircraft 102, internal standard atmosphere deviation, center of gravity of the aircraft 102, ambient temperature, wind speed, and/or the like. The control unit 110 can generate the neural network models. In at least one example, for a particular aircraft, such as the aircraft 102, the control unit 110 uses the data 108 received from the aircraft 102. As such, the control unit 110 analyzes data 108 from one or more actual flights of the specific aircraft 102 (as opposed to a different aircraft, such as a test aircraft). In at least one example, the control unit 110 generates and determines one or more deep neural network models from the data 108, such as the neural networks shown in FIGS. 2 and 3. For example, the control unit 110 determines the one or more deep neural networks to establish a fuel flow/burn model, as shown in FIG. 2, and determined the rate of climb neural network as shown in FIG. 3 to compute rate of climb and distance travelled during the climb phase of the aircraft 102 during a particular flight.

In at least one example, the control unit 110 is configured to determine a lowest cost index for a climb phase of flight from a plurality of cost indices. As an example, for a given flight condition, the control unit 110 iterates over a range of cost indices to determine the lowest-cost cost index. For each candidate cost index, the control unit 110 estimates fuel flow for a climb phase until a top of climb (that is, a beginning of cruise), using the fuel flow neural network model shown in FIG. 2, and the rate of climb neural network model shown in FIG. 3. In at least one further example, the control unit 110 then estimates fuel flow from the top of climb until a particular distance from origin (such as 250 nautical miles from a departure airport) using one or more cruise fuel flow models. The distance for origin can be greater than 250 nautical miles (such as 300 nautical miles or more), or less than 250 nautical middles (such as 100 nautical miles or less). Next, the control unit 110 calculates the total cost for climb phase and part of cruise phase. Based on such total cost, the control unit 110 determines the cost index resulting in the lowest total cost. Such cost index is then recommended to a flight deck, such as by the control unit 110 showing the recommendation on the monitor 114.

Thus, instead of relying on a fixed Mach speed predetermined through a test aircraft and/or a generic model that is not specific to the aircraft 102, the control unit 110 analyzes the data 108 from the actual aircraft 102 itself to determine efficient climb phase attributes for the aircraft 102. In at least one example, the control unit 110 determines a lowest cost index for a climb phase of the aircraft 102. The lowest cost index can be determined based on one or more neural network models, such as the neural network models shown in FIGS. 2 and 3.

The control unit 110 is configured to determine the efficient climb phase attributes for the particular aircraft 102 based on the actual data 108 received from the aircraft 102, in contrast to a different aircraft, and/or a generic model of a different aircraft. In at least one example, the control unit 110 is configured to compute a total cost including climb phase and one or more overlapping portions of a cruise phase of flight to establish an optimal cost index. Accordingly, the systems and methods described herein reduce fuel consumption, reduce emissions, and reduce time cost for the climb phase of flight of the aircraft.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 110 may be or include one or more processors that are configured to control operation, as described herein.

The control unit 110 is configured to execute a set of instructions that are stored in one or more data storage units or elements (such as one or more memories), in order to process data. For example, the control unit 110 may include or be coupled to one or more memories. The data storage units may also store data or other information as desired or needed. The data storage units may be in the form of an information source or a physical memory element within a processing machine.

The set of instructions may include various commands that instruct the control unit 110 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 110 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and nonvolatile RAM (NVRAM) memory. The above data storage unit types are exemplary only, and are thus not limiting as to the types of memory usable for storage of a computer program.

In at least one example, the control unit 110 can further control, at least in part, the controls 104 of the aircraft 102 to operate the aircraft 102 based on the determined efficient climb phase attributes. For example, based on the determined efficient climb phase attributes, the control unit 110 can automatically operate the controls 104 to increase or decrease ground or airspeed, rate of climb, and the like of the aircraft 102 based on the determined efficient climb phase attributes.

In at least one example, all or part of the systems and methods described herein may be or otherwise include an artificial intelligence (AI) or machine-learning system that can automatically perform the operations of the methods also described herein. For example, the control unit 110 can be an artificial intelligence or machine learning system. These types of systems may be trained from outside information and/or self-trained to repeatedly improve the accuracy with how the data 108 is analyzed to determine the efficient climb phase attributes based on a plurality of flights of the aircraft 102. Over time, these systems can improve by determining climb phase attributes with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), or the like. The systems may be trained and re-trained using feedback from one or more prior analyses of the data 108, ensemble data, and/or other such data. Based on this feedback, the systems may be trained by adjusting one or more parameters, weights, rules, criteria, or the like, used in the analysis of the same. This process can be performed using the data 108 and ensemble data instead of training data, and may be repeated many times to repeatedly improve the determination of the efficient climb phase parameters. The training minimizes conflicts and interference by performing an iterative training algorithm, in which the systems are retrained with an updated set of data (for example, data 108 received during and/or after each flight of the aircraft 102) and based on the feedback examined prior to the most recent training of the systems. This provides a robust analysis model that can better determine the most cost effective and efficient climb phase parameters for the aircraft 102.

Examples of the subject disclosure provide systems and methods that allow large amounts of data to be quickly and efficiently analyzed by a computing device. For example, the control unit 110 can analyze various aspects of flights of the aircraft 102 based on the data 108 received from the sensors 106. Further, the control unit 110 creates variables based on the various aspects, and determines efficient climb phase parameters from the variables, which can be in a format not readily discernable by a human being. As such, large amounts of data, which may not be discernable by human beings, are being tracked and analyzed. The vast amounts of data are efficiently organized and/or analyzed by the control unit 110, as described herein. The control unit 110 analyzes the data in a relatively short time in order to quickly and efficiently determine the efficient climb phase parameters in real time. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one embodiment, components of the system 100, such as the control unit 110, provide and/or enable a computer system to operate as a special computer system for determining efficient climb phase parameters for the aircraft 102. The control unit 110 improves upon computing devices that use test data of a different test aircraft by allowing for the determination of aircraft-specific efficient climb phase parameters.

Figure 4:
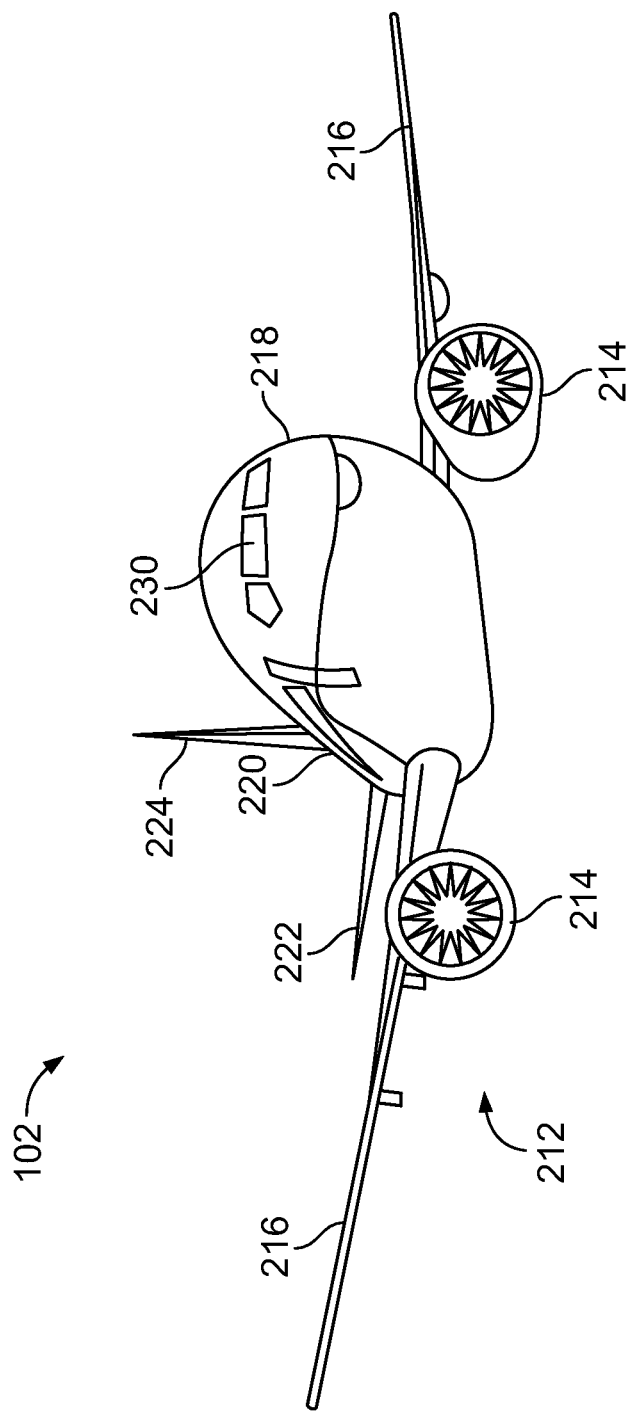
FIG. 4 illustrates a perspective front view of an aircraft, according to an example of the present disclosure.

FIG. 4 illustrates a perspective front view of the aircraft 102, according to an example of the present disclosure. The aircraft 102 includes a propulsion system 212 that includes engines 214, for example. Optionally, the propulsion system 212 may include more engines 214 than shown. The engines 214 are carried by wings 216 of the aircraft 102. In other embodiments, the engines 214 may be carried by a fuselage 218 and/or an empennage 220. The empennage 220 may also support horizontal stabilizers 222 and a vertical stabilizer 224. The fuselage 218 of the aircraft 102 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. FIG. 4 shows an example of an aircraft 102. It is to be understood that the aircraft 102 can be sized, shaped, and configured differently than shown in FIG. 4.

Figure 5:
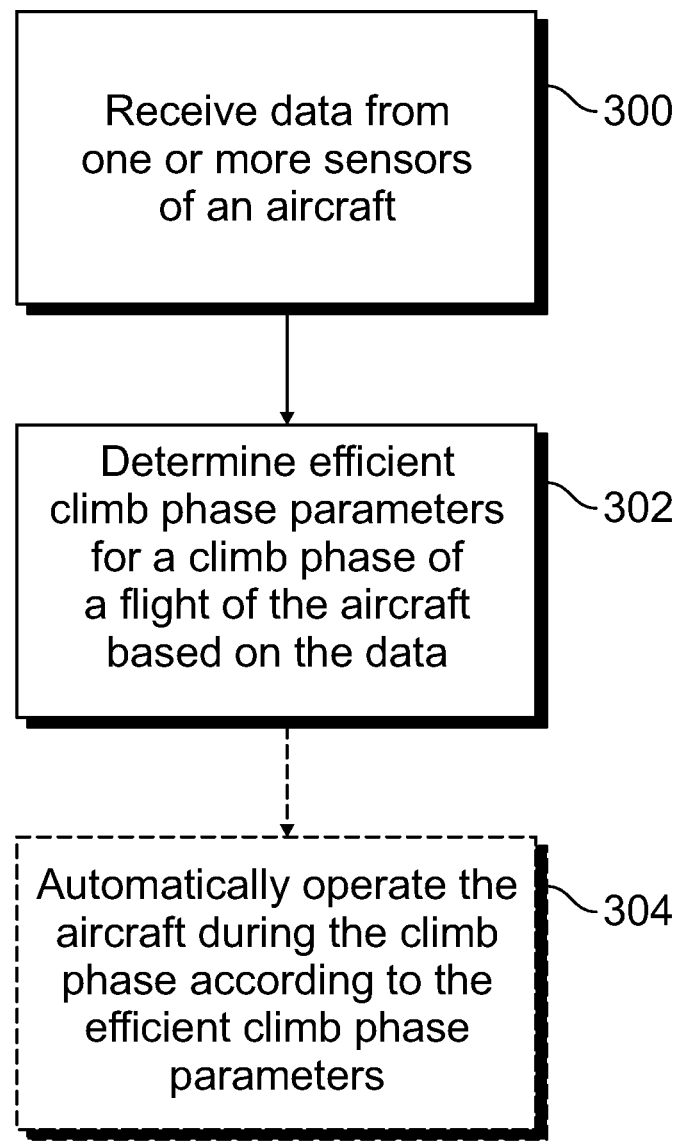
FIG. 5 illustrates a flow chart of a method for operating an aircraft during a climb phase of flight, according to an example of the present disclosure.

FIG. 5 illustrates a flow chart of a method for operating an aircraft during a climb phase of flight, according to an example of the present disclosure. Referring to FIGS. 1 and 5, at 300, the control unit 110 receives the data 108 (such as avionics data) from one or more sensors 106 of the aircraft 102. In at least one example, the data 108 relates to various aspects of a current flight and/or one or more previous flights of the aircraft 102 (not another aircraft, such as a test aircraft). At 302, based on the data 108, the control unit 110 determines efficient climb phase parameters (such as airspeed from takeoff to top of climb, rate of climb, time of climb, and/or the like) for a climb phase of a current or future flight of the aircraft 102. Optionally, at 304, the control unit 110 (and/or a flight computer of the aircraft 102) automatically operates the aircraft 102 during the climb phase according to the efficient climb phase parameters.

Further, the disclosure comprises examples according to the following clauses:

Clause 1. A system for operating an aircraft during a climb phase of flight, the system comprising:
 a control unit configured to receive data regarding one or both of a current flight or one or more previous flights of the aircraft from one or more sensors of the aircraft, wherein the control unit is further configured to determine efficient climb phase parameters for the aircraft based on the data, and wherein the aircraft is operated during the climb phase of one or both of the current flight or one or more future flights according to the efficient climb phase parameters.

Clause 2. The system of Clause 1, further comprising the one or more sensors.

Clause 3. The system of Clause 2, wherein the one or more sensors comprise one or more flight recorders.

Clause 4. The system of Clause 3, wherein the one or more sensors further comprise one or more of one or more speed sensors, one or more altitude sensors, one or more position sensors, one or more ambient sensors, or one or more weight sensors.

Clause 5. The system of any of Clauses 1-4, wherein the control unit is onboard the aircraft.

Clause 6. The system of any of Clauses 1-5, wherein the control unit is configured to determine the efficient climb phase parameters for a future flight of the aircraft based on the data received from one or more previous flights of the aircraft.

Clause 7. The system of any of Clauses 1-6, wherein the control unit is configured to determine the efficient climb phase attributes by generating one or more climb phase neural network models for the aircraft based on the data.

Clause 8. The system of any of Clauses 1-7, wherein the control unit is further configured to show the efficient climb phase attributes on a monitor within a flight deck of the aircraft.

Clause 9. The system of any of Clauses 1-8, wherein the control unit is configured to determine the efficient climb phase attributes by determining a lowest cost index from a plurality of cost indices.

Clause 10. The system of any of Clauses 1-9, wherein the control unit is further configured to automatically operate controls of the aircraft during the climb phase according to the efficient climb phase parameters.

Clause 11. A method for operating an aircraft during a climb phase of flight, the method comprising:
 receiving, by a control unit, data regarding one or both of a current flight or one or more previous flights of the aircraft from one or more sensors of the aircraft; and
 determining, by the control unit, efficient climb phase parameters for the aircraft based on the data, wherein the aircraft is operated during the climb phase of one or both of the current flight or one or more future flights according to the efficient climb phase parameters.

Clause 12. The method of Clause 11, wherein the one or more sensors comprise one or more flight recorders.

Clause 13. The method of Clause 12, wherein the one or more sensors further comprise one or more of one or more speed sensors, one or more altitude sensors, one or more position sensors, one or more ambient sensors, or one or more weight sensors.

Clause 14. The method of any of Clauses 11-13, further comprising disposing the control unit onboard the aircraft.

Clause 15. The method of any of Clauses 11-14, wherein said determining comprises determining the efficient climb phase parameters for a future flight of the aircraft based on the data received from one or more previous flights of the aircraft.

Clause 16. The method of any of Clauses 11-15, wherein said determining comprises determining the efficient climb phase attributes by generating one or more climb phase neural network models for the aircraft based on the data.

Clause 17. The method of any of Clauses 11-16, further comprising showing, by the control unit, the efficient climb phase attributes on a monitor within a flight deck of the aircraft.

Clause 18. The method of any of Clauses 11-17, wherein said determining comprises determining the efficient climb phase attributes by determining a lowest cost index from a plurality of cost indices.

Clause 19. The method of any of Clauses 11-18, further comprising automatically operating, by the control unit, controls of the aircraft during the climb phase according to the efficient climb phase parameters.

Clause 20. A non-transitory computer-readable storage medium comprising executable instructions that, in response to execution, cause one or more control units comprising a processor, to perform operations comprising:
 receiving data regarding one or both of a current flight or one or more previous flights of an aircraft from one or more sensors of the aircraft; and
 determining efficient climb phase parameters for the aircraft based on the data, wherein the aircraft is operated during a climb phase of one or both of the current flight or one or more future flights according to the efficient climb phase parameters.

As described herein, examples of the present disclosure provide systems and methods for efficiently operating an aircraft during a climb phase of flight.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for operating an aircraft during a climb phase of flight, the system comprising:
    a control unit configured to receive data regarding aspects of the aircraft before and during the climb phase of one or both of a current flight or one or more previous flights of the aircraft from one or more sensors of the aircraft,
    wherein the control unit is further configured to determine climb phase parameters for the aircraft based on the data regarding the aspects of the aircraft before and during the climb phase of one or both of the current flight or the one or more previous flights of the aircraft, and wherein the aircraft is operated during the climb phase of one or both of the current flight or one or more future flights according to the climb phase parameters.

2. The system of claim 1, further comprising the one or more sensors.

3. The system of claim 2, wherein the one or more sensors comprise one or more flight recorders.

4. The system of claim 3, wherein the one or more sensors further comprise one or more speed sensors, one or more altitude sensors, one or more position sensors, one or more ambient sensors, and one or more weight sensors.

5. The system of claim 1, wherein the control unit is onboard the aircraft.

6. The system of claim 1, wherein the control unit is configured to determine the climb phase parameters for a future flight of the aircraft based on the data received from one or more previous flights of the aircraft.

7. The system of claim 1, wherein the control unit is configured to determine the climb phase attributes by generating one or more climb phase neural network models for the aircraft based on the data.

8. The system of claim 1, wherein the control unit is further configured to show the climb phase attributes on a monitor within a flight deck of the aircraft.

9. The system of claim 1, wherein the control unit is configured to determine the climb phase attributes by determining a lowest cost index from a plurality of cost indices.

10. The system of claim 1, wherein the control unit is further configured to automatically operate controls of the aircraft during the climb phase according to the climb phase parameters.

11. A method for operating an aircraft during a climb phase of flight, the method comprising:
    receiving, by a control unit, data regarding aspects of the aircraft before and during the climb phase of one or both of a current flight or one or more previous flights of the aircraft from one or more sensors of the aircraft; and
    determining, by the control unit, climb phase parameters for the aircraft based on the data aspects of the aircraft before and during the climb phase of one or both of the current flight or the one or more previous flights of the aircraft, wherein the aircraft is operated during the climb phase of one or both of the current flight or one or more future flights according to the climb phase parameters.

12. The method of claim 11, wherein the one or more sensors comprise one or more flight recorders.

13. The method of claim 12, wherein the one or more sensors further comprise one or more speed sensors, one or more altitude sensors, one or more position sensors, one or more ambient sensors, and one or more weight sensors.

14. The method of claim 11, further comprising disposing the control unit onboard the aircraft.

15. The method of claim 11, wherein said determining comprises determining the climb phase parameters for a future flight of the aircraft based on the data received from one or more previous flights of the aircraft.

16. The method of claim 11, wherein said determining comprises determining the climb phase attributes by generating one or more climb phase neural network models for the aircraft based on the data.

17. The method of claim 11, further comprising showing, by the control unit, the climb phase attributes on a monitor within a flight deck of the aircraft.

18. The method of claim 11, wherein said determining comprises determining the climb phase attributes by determining a lowest cost index from a plurality of cost indices.

19. The method of claim 11, further comprising automatically operating, by the control unit, controls of the aircraft during the climb phase according to the climb phase parameters.

20. A non-transitory computer-readable storage medium comprising executable instructions that, in response to execution, cause one or more control units comprising a processor, to perform operations comprising:
- receiving data regarding aspects of the aircraft before and during the climb phase of one or both of a current flight or one or more previous flights of an aircraft from one or more sensors of the aircraft; and
- determining efficient climb phase parameters for the aircraft based on the data aspects of the aircraft before and during the climb phase of one or both of the current flight or the one or more previous flights of an aircraft, wherein the aircraft is operated during a climb phase of one or both of the current flight or one or more future flights according to the efficient climb phase parameters.

* * * * *